(12) United States Patent
Johnston

(10) Patent No.: US 12,203,576 B1
(45) Date of Patent: Jan. 21, 2025

(54) INTERLOCKING CONDUIT HOLDER AND SPACER

(71) Applicant: Millcreek Electrical, Inc., Ceres, CA (US)

(72) Inventor: Timothy Johnston, Modesto, CA (US)

(73) Assignee: Millcreek Electrical, Inc., Ceres, CA (US)

( * ) Notice: Subject to any disclaimer, the term of this patent is extended or adjusted under 35 U.S.C. 154(b) by 0 days.

(21) Appl. No.: 18/239,295

(22) Filed: Aug. 29, 2023

(51) Int. Cl.
*F16L 3/04* (2006.01)

(52) U.S. Cl.
CPC .................... *F16L 3/04* (2013.01)

(58) Field of Classification Search
CPC ........................................... F16L 3/04
USPC .................. 248/69; 403/335, 345
See application file for complete search history.

(56) References Cited

U.S. PATENT DOCUMENTS

| | | | |
|---|---|---|---|
| 6,065,730 A | 5/2000 | Marks | |
| 7,150,437 B1 * | 12/2006 | Teeters | F16L 3/04 248/74.1 |
| 7,806,629 B2 * | 10/2010 | McCoy | H02G 9/06 405/184 |
| 7,942,371 B1 * | 5/2011 | McCoy | H02G 9/02 248/68.1 |
| 9,225,156 B2 * | 12/2015 | Boyer | H02G 3/32 |
| 2006/0284025 A1 * | 12/2006 | Faucher | F16L 3/22 248/58 |
| 2008/0279635 A1 * | 11/2008 | McCoy | H02G 9/06 405/155 |
| 2017/0184223 A1 * | 6/2017 | Dean | F16L 3/1211 |

* cited by examiner

*Primary Examiner* — Todd M Epps
(74) *Attorney, Agent, or Firm* — Heisler & Associates

(57) ABSTRACT

Conduits are held in a desired position inboard of a form board supporting hardening cementitious material through at least one spacer. The spacer is attached at a proximal end to the form board and has a distal end extending out over the hardening cementitious material where a saddle or other engagement supports the conduit. A tab can extend up from the spacer to help support the conduit. One saddle is semi-circular and provided in matching size to various conduits for secure support but easy lateral removal. Spacers can have interlocks, such as male and female dovetail structures, on lateral sides thereof to secure groups of spacers together, and thus precisely align conduits relative to each other. A step and lip near the proximal end of the spacer can engage an outer surface of the form board either for four inch wall conduit positioning or six inch wall conduit positioning.

20 Claims, 5 Drawing Sheets

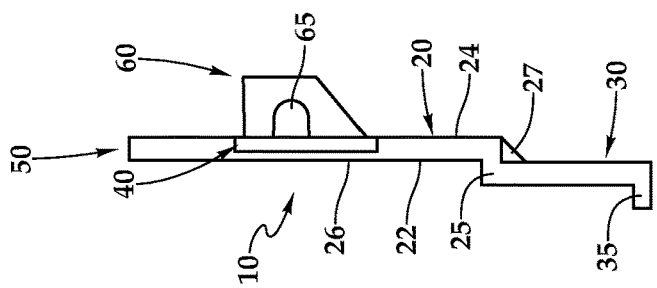
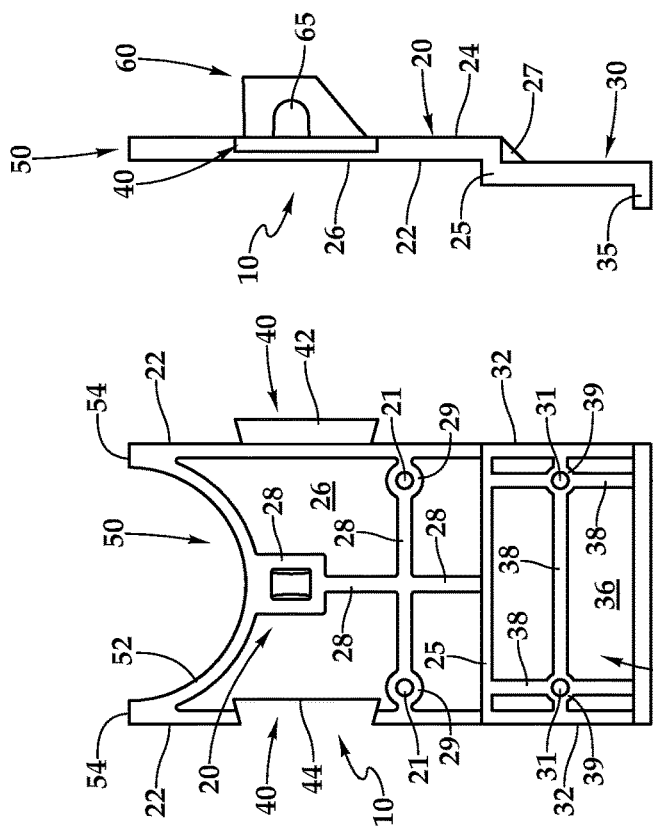
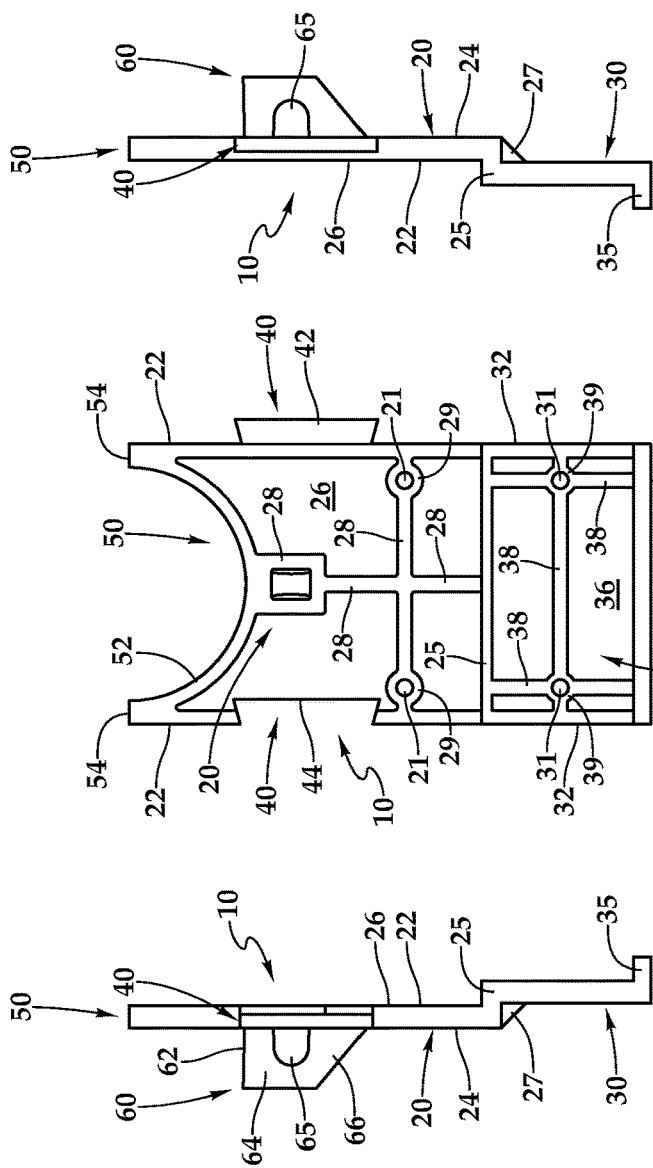
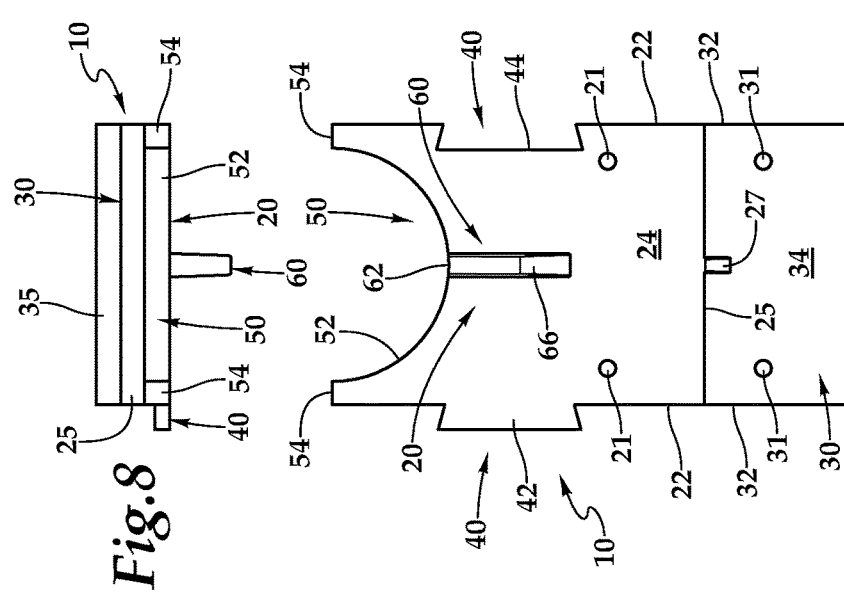
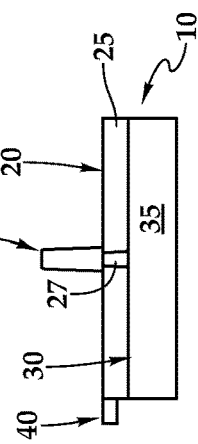

INTERLOCKING CONDUIT HOLDER AND SPACER

FIELD OF THE INVENTION

The following invention relates to spacers for supporting conduits extending vertically up out of cementitious material that is hardening adjacent to a form board. More particularly, this invention relates to spacers which are configured with a semi-circular saddle for easy removal from conduits after use, and which include interlocks for attachment of multiple spaces together for desirable positioning of conduit groupings relative to each other.

BACKGROUND OF THE INVENTION

Before a concrete foundation is poured much preparation must first occur. Form boards are placed adjacent to walls of the foundation to provide lateral containment for the cementitious material. Even if a slab is being poured along with a footing in a single monolithic pour, at least an outer form board will be utilized.

Before the foundation can be poured a variety of utilities and other structures typically need to be positioned where desired. Examples of such structures include reinforcing materials, anchor bolts, moisture barriers and perhaps other structures.

Examples of utilities, which may need to be accurately placed before pouring of the foundation include sewer plumbing lines, freshwater plumbing lines, drain pipes, vent pipes, electrical conduits and potentially a variety of other utilities and structures such as auxiliary conduits of initial unspecified use to allow for access through the foundation at a later point in time.

It is desirable that conduits and other often cylindrical elongate structures be precisely held where they are desired to be located. Once the concrete has hardened, it is exceptionally difficult to move such conduits. In many instances, the conduits are located so that they can pass up through exterior walls of a structure to be built upon the foundation. Thus, the conduits need to be spaced just inboard of the outer form board.

Precise spacing of such wall conduit extending up out of a foundation provides a number of benefits. Structural integrity of the foundation is maintained when cementitious material of an adequate amount is located on both inside and outside portions of the conduits. Precise spacing of the conduit means that later installation of further conduit runs which connect to conduit elements extending up out of the foundation (such as within walls of the structure built upon the foundation), can be easily placed where desired and avoid interfering with vertical structural members to a great extent. When conduits are properly placed, any need to "fur out" interior walls to make up for improperly placed conduit is avoided. This saves time and preserves interior space for the structure.

Often it is desirable to group conduits within sets of multiple conduits at various different locations. For instance, beneath a position for mounting of an electrical panel of a structure it is often desirable to have multiple conduits extending up through the foundation. Multiple such conduits can allow for a larger amperage panel fed by separate electrical lines to facilitate both input and output of electric power from the panel and can allow for auxiliary access to the panel should the panel be expanded in the future or otherwise modified. It can be difficult to maintain an optimal space in-between such conduits. If the conduits are in contact with each other, cementitious material cannot pass therebetween and the foundation is weakened at that location. Also, if the conduits are bundled together it makes it difficult to install the fitting required to extend these conduits up into the wall, once the slab is poured. Space is needed around each conduit for the installation of couplings and/or connectors. If the conduits are too far apart, it becomes more difficult to keep the set of conduits between vertical studs located with the wall extending up from the foundation or other vertical support members. Thus, a benefit is provided if optimal conduit spacing can be maintained.

Foundation contractors and electrical contractors are by nature skilled and creative in developing solutions for optimal conduit support extending up out of foundations. However, not all subcontractors have similar skill levels. Furthermore, in many instances a solution to a problem in one step of construction becomes a problem for some other contractor, and is thus often allowed to occur by the first contractor without regard for the future problems being created. If suitable equipment is made readily available for supporting conduits in optimal positions, a higher likelihood exists that optimal conduit spacing extending up out of concrete foundations can be provided for the benefit of all.

Many walls supported above foundations have either a four inch or a six inch nominal thickness (at least within North American construction). Depending on whether the wall is a four inch wall or a six inch wall, optimal conduit positioning can differ. Accordingly, any solutions for providing convenient conduit support during hardening of cementitious material would benefit from accommodating ideal conduit position for both four inch and six inch walls. The resulting conduits are thus vertically positioned ideally for extending the conduits up into the walls at a later stage in the construction process.

It is known in the prior art for anchor bolts to be held in position within hardening cementitious material by anchor bolt holders which attach to the form board and cantilever out over the hardening cementitious material to a hole, with the anchor bolt passing through this hole. While this product is generally suitable for anchor bolt positioning, it provides a complete circular hole through which the anchor bolt passes. After this cementitious material has hardened, it can be difficult to remove such spacers because they need to be vertically lifted up off of the anchor bolts, which may have threads that are encrusted with cementitious material, or may have a nut thereon which needs to be unthreaded before removal can occur.

Adapting such an anchor bolt holder to conduit positioning would similarly be difficult to remove, in that conduits typically have some form of plug, cap or tape on an upper surface thereof to keep the cementitious material from going inside the conduit, which plug, cap or tape can defeat the removal process for a full circle hole in an anchor bolt support style conduit support. Furthermore, it is rare that anchor bolts need to be grouped together in close sets of anchor bolts. Rather, anchor bolts are typically spaced apart uniform distances from each other, which are too great for a single spacer or grouping of spacers to conveniently provide such spacing.

Other prior art devices, such as that disclosed in the patent to Teeters (U.S. Pat. No. 7,150,437) are only provided for holding a single conduit. Also, steps are provided on an engagement surface to accommodate conduits of different sizes, rather than providing different spacers configured optimally for different sizes of conduits.

Accordingly, a need exists for a conduit support spacer which can support at least one conduit, but preferably a set of conduits in a precise desired location within hardening cementitious material. Beneficially, such a spacer would accommodate proper conduit positioning for a variety of different sizes of conduit within the set of conduits to be supported, and at optimal locations for both four inch and six inch thick walls. Furthermore, such a spacer would beneficially be easy to install and easy to remove, supporting reuse thereof and avoiding waste.

SUMMARY OF THE INVENTION

With this invention, at least one conduit spacer (and typically an assembly of at least two conduit spacers) is provided to hold conduits in a precise desired position within hardening cementitious material adjacent to a form board or other support. The spacer includes a body with a proximal end opposite a distal end. The proximal end is configured to be attached to the form board. The distal end includes an engagement for supporting at least one conduit in a desired position. In one embodiment this engagement is a semi-circular saddle.

The proximal end of the body is in one example provided with both a main body and an extension body, with a step between the main body and the extension body, and with a lip extended downward from a proximal end of the extension body. Either the step or the lip are provided adjacent to an outer edge of an upper surface of the form board, so that either a four inch wall positioning or six inch wall positioning is precisely accommodated for the conduit which is loaded and supported adjacent to the engagement at the distal end of each spacer. When conduits are to be held in position at locations spaced away from form boards, such as in the middle of a slab, the proximal end of the body can attach to some other support rather than to the form boards.

While a spacer can be used singly, often at least two spacers are used together. Lateral sides of the spacers are thus provided with interlocks in some embodiments. These interlocks are complemental in form so that lateral sides of two spacers can be locked adjacent to each other and used simultaneously while attached to the same form board and supporting two conduits at the distal end thereof. In one embodiment the pair of interlocks are in the form of male and female interlocks, such as male and female dovetails. These dovetails are all similar in size and shape, while the spacers can be for conduits of a similar size or a variety of different sizes. By precisely placing the interlocks a similar distance away from the step and lip, an assembly of conduits will be precisely positioned where desired when adjacent spacers are attached together through such interlocks.

In one form of the invention, a tab extends up from an upper surface of the main body of each spacer adjacent to the saddle. A face of the tab provides a surface which is aligned with a semi-cylindrical surface of the semi-circular saddle. This face of the tab thus provides further support for the conduit to assist in keeping the conduit extending vertically up out of the cementitious material while it is hardening. Furthermore, the tab can include a hole passing through which can receive baling wire, a zip tie, a Velcro hook and loop fastener strap (VELCRO being a trademark of Velcro IP Holdings LLC of Manchester, New Hampshire), or other fastener which can grab the conduit and help to hold the conduit tightly within the saddle.

Because the saddle is only semi-circular and having an angular form extending no more than about 180°, the spacer can be readily removed from the conduit after the cementitious material has hardened. In particular, any fasteners such as baling wire can be cut or otherwise detached, and the spacer can then be moved laterally toward the form board and away from the conduit, leaving the conduit (or set of conduits) extending vertically up out of the cementitious material precisely were desired.

Nail holes pass through the main body and/or extension body at strategic locations, and are spaced away from the lip and/or step so that nails passing through these holes (or other mechanical fasteners) can attach to the form board and hold the spacer precisely where desired (to thus in turn hold the conduit precisely where desired) while the cementitious material hardens. After hardening, the nails or other fasteners can be removed, any wire or other lanyard removed from girding the conduits and the spacer (or spacers as an assembly) can be laterally moved away from the conduits in toward the form board for easy removal and reuse. Reuse can occur either in a common assembly or spacers can be separated from each other by disengaging interlocks from each other, and the spacers can be used in other subcombinations in the future.

OBJECTS OF THE INVENTION

Accordingly, a primary object of the present invention is to provide a conduit spacer which provides firm and secure support of a conduit precisely where desired during hardening of cementitious material.

Another object of the present invention is to provide a conduit spacer which can be used with other conduit spacers to hold a set of conduits precisely were desired within a foundation and relative to each other, while cementitious material of the foundation hardens.

Another object of the present invention is to provide a conduit spacer which comes in different sizes for different sizes of conduit, and which different sizes of spacers can be attached together for supporting different size conduit within a set of conduits extending up out of hardening cementitious material.

Another object of the present invention is to provide a conduit spacer which can work with both four inch and six inch walls, extending up from a foundation formed of the cementitious material.

Another object of the present invention is to provide a conduit spacer which is both easy to attach to a form board and attach to conduits for desirable positioning of the conduits within hardening cementitious material, and also for easy removal of the conduit spacers when the cementitious material has hardened.

Another object of the present invention is to provide a conduit spacer which can interlock with adjacent similar conduit spacers so that sets of spacers can support sets of conduits precisely where desired to be located and oriented extending up out of hardening cementitious material.

Another object of the present invention is to provide a method for holding conduits and especially groups of multiple conduits at precise positions extending vertically up out of hardening cementitious material.

Other further objects of the present invention will become apparent from a careful reading of the included drawing figures, the claims and detailed description of the invention.

BRIEF DESCRIPTION OF THE DRAWINGS

FIG. 4 is a top plan view of the spacer of FIG. 3.

FIG. 5 is a right side view of that which is shown in FIG. 4.

FIG. 6 is a bottom plan view of that which is shown in FIG. 4.

FIG. 7 is a left side view of that which is shown in FIG. 4.

FIG. 8 is a distal end view of that which is shown in FIG. 4.

FIG. 9 is a proximal end view of that which is shown in FIG. 4.

DESCRIPTION OF THE PREFERRED EMBODIMENT

Figure 1:
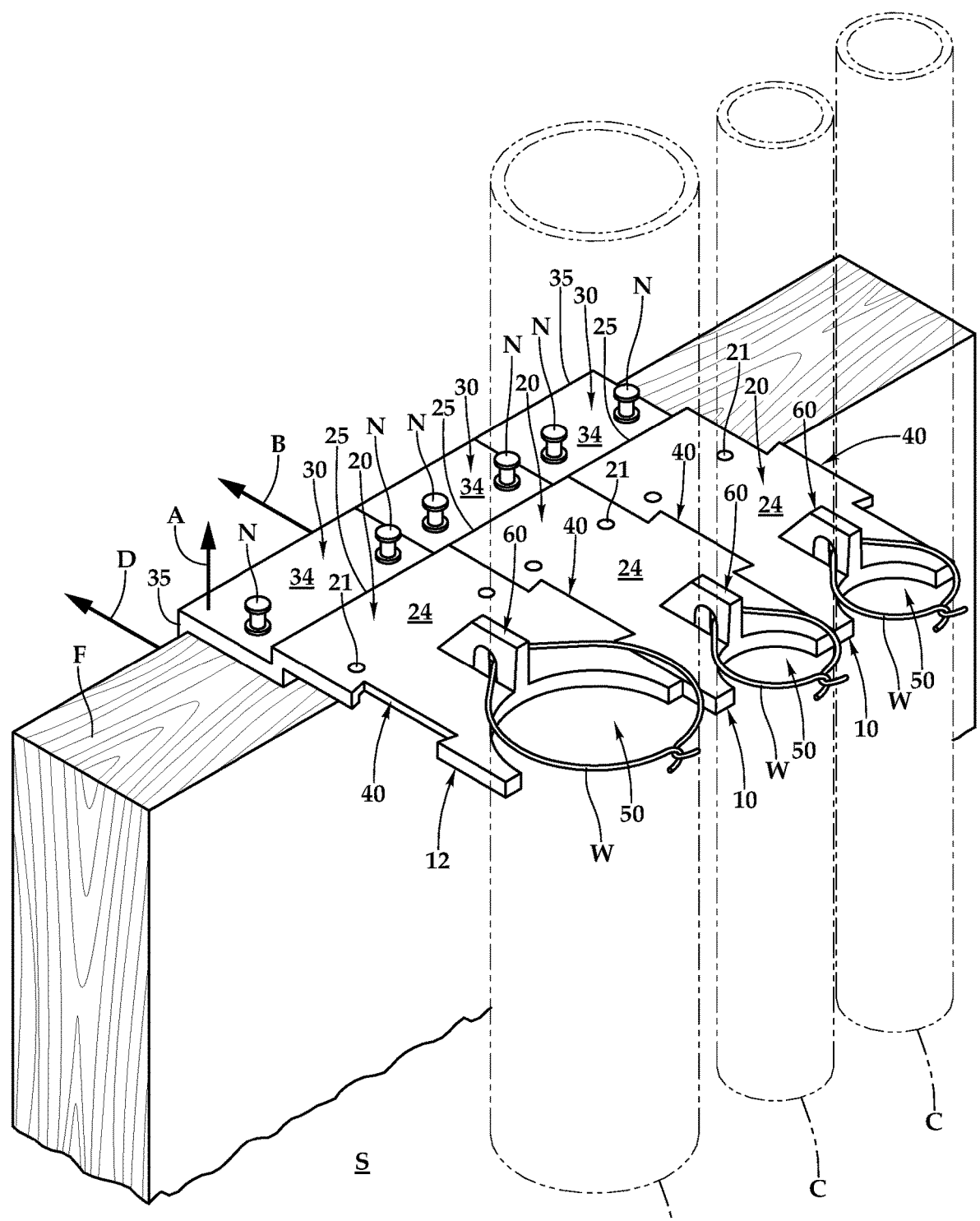
FIG. 1 is a perspective view of a set of three conduit spacers, two being similar size and one being larger, for supporting conduits adjacent thereto within a space inboard of form boards where cementitious material is to be poured and harden.

Referring to the drawings, wherein like reference numerals represent like parts throughout the various drawing figures, reference numeral 10 is directed to a conduit spacer (FIG. 1) which can hold a conduit C within hardening cementitious material while the conduit spacer 10 is anchored to a form board F adjacent to a space S where cementitious material is hardening, such as a foundation. The conduit spacer 10 can be used with other conduit spacers interlocked together to hold an assembly of conduits C in a desired cluster precisely located where desired.

Figure 2:
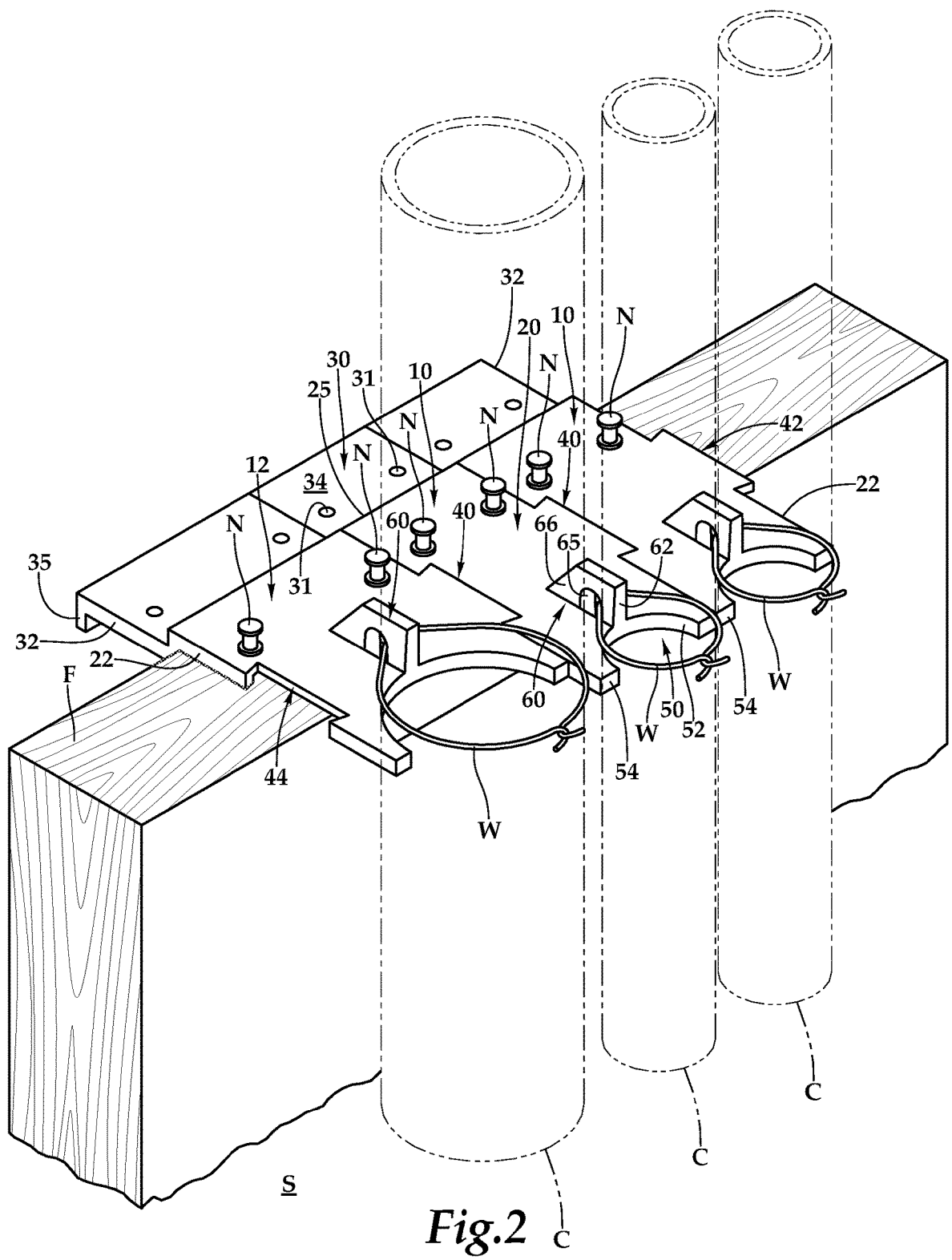
FIG. 2 is a perspective view similar to that which is shown in FIG. 1, except that the spacers are shown attached to the form board in a configuration accommodating a thinner wall then that depicted in FIG. 1.
Figure 3:
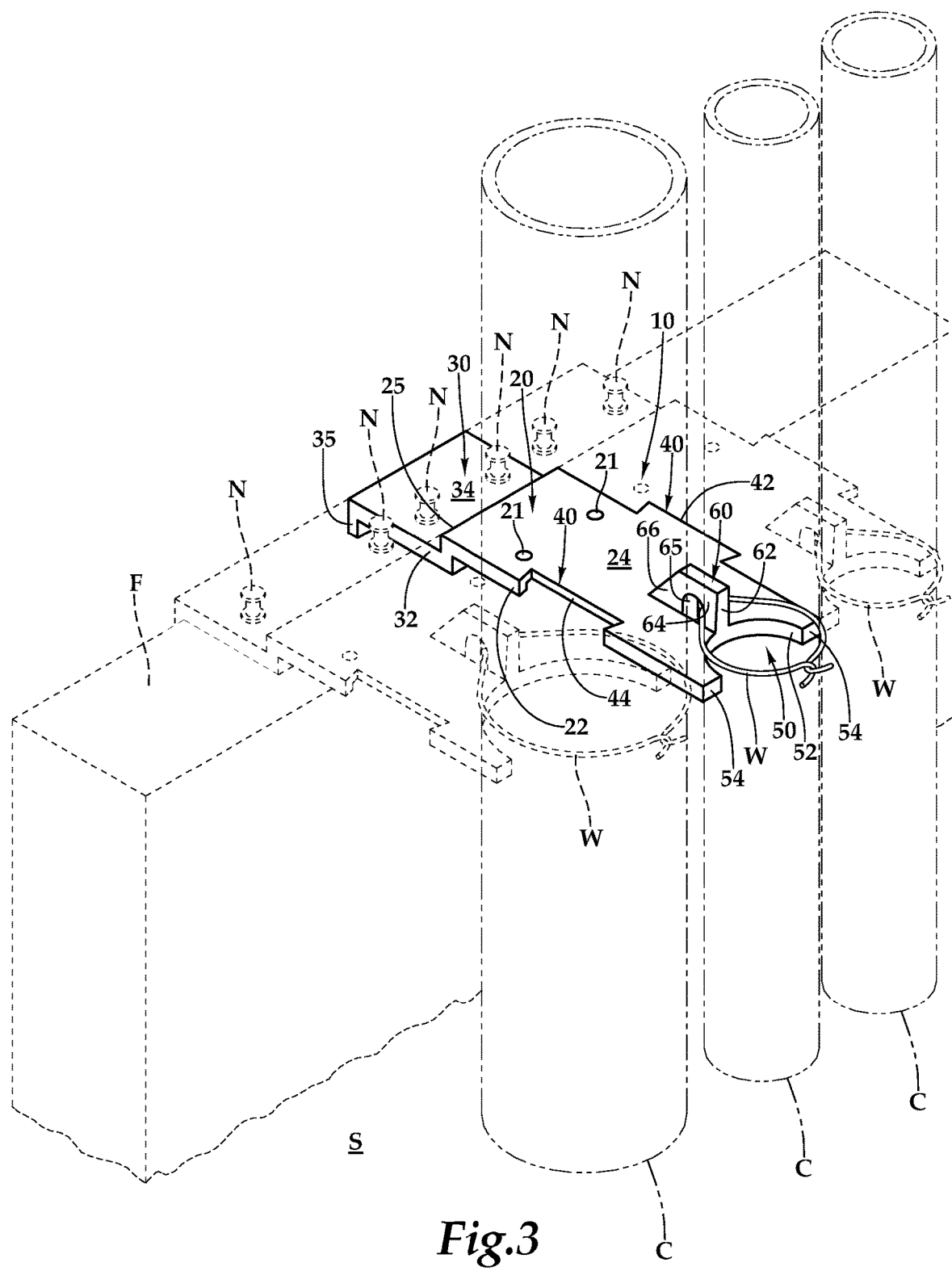
FIG. 3 is a perspective view similar to that which is shown in FIG. 1, except that only a single central spacer is shown in solid lines, and with the form board, conduits and adjacent spacers shown in broken lines, so that further details of the central spacer can be clearly depicted.

In essence, and with particular reference to FIG. 3, details of the conduit spacer 10 (and a set of multiple conduit spacers 10, 12 in FIGS. 1 and 2) are described, according to an example embodiment. The conduit spacer 10 is a rigid mass of material which is typically unitary in form, including a main body 20 and an extension body 30 on a proximal side of the main body 20. Dovetails 40 provide one form of interlock on lateral sides 22 of the conduit spacer 10 to join adjacent conduit spacers 10, 12 to each other. A yoke 50 provides a preferred form of engagement with a conduit C at a distal end of the conduit spacer 10. A tab 60 extends upwardly from the main body 20 adjacent to the yoke 50, to provide further support for the conduit C when it is engaged by the yoke 50. A step 25 or lip 35 abut an outer edge of an upper side of a form board F for precise placement of the conduit spacer 10 relative to the form board E Nail holes 21, 31 can work with nails and/or other fasteners to secure the conduit spacer 10 (or multiple conduit spacers 10, 12) to the form boards F.

More specifically, and with particular reference to FIGS. 3, 4 and 6, details of the main body 20 of the conduit spacer 10 are described, according to this example embodiment. The main body 20 is preferably formed along with the extension body 30 and other portions of the conduit spacer 10 as unitary mass of material. In one embodiment, the conduit spacer 10 is formed by injection molding with a plastic material such as polyethylene, nylon or ABS (Acrylonitrile Butadiene Styrene). In other embodiments, the conduit spacer 10 could be machined or 3-D printed or otherwise formed to have a shape such as that shown in the example embodiment disclosed herein or alternate embodiments.

Figure 10:
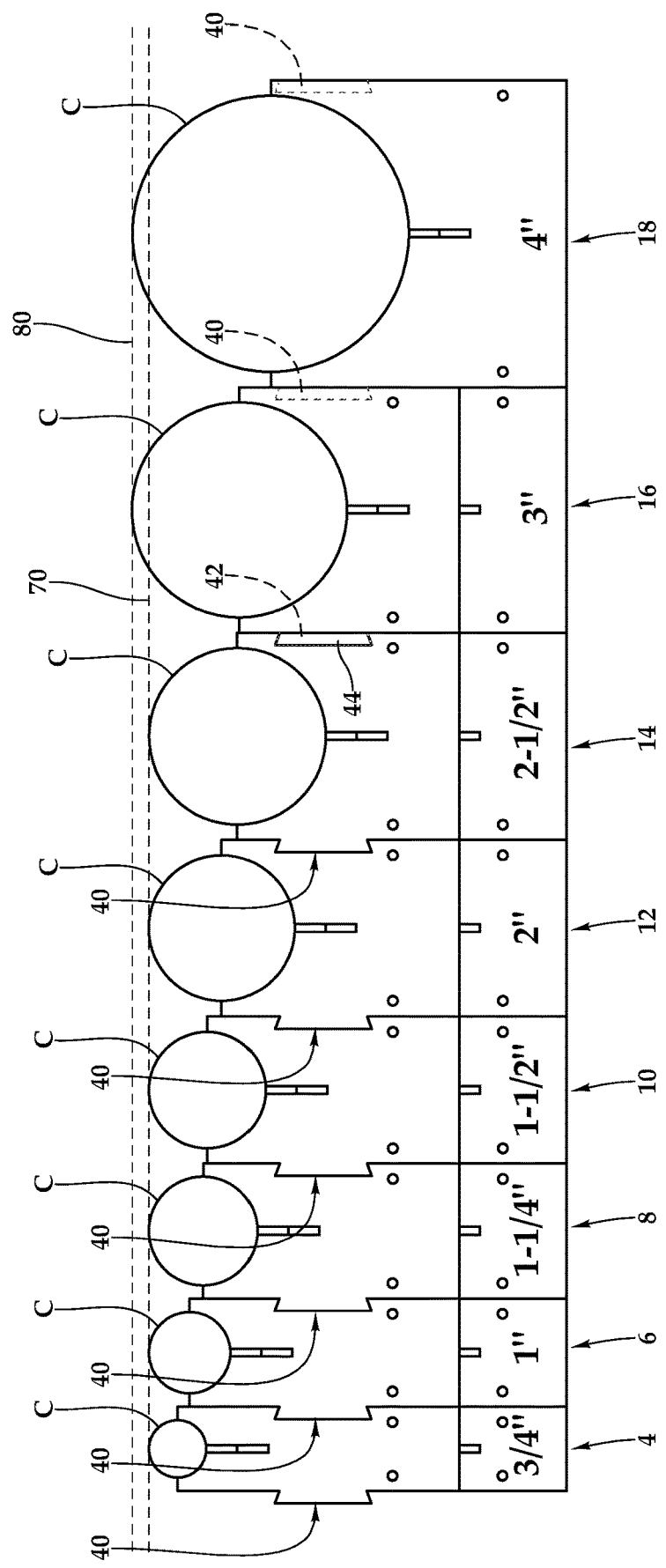
FIG. 10 is a top plan view of a set of nine spacers of different sizes, all shown adjacent to each other and with at least some of these spacers attached together and illustrating different positions of conduits for different sizes of conduit relative to a main reference lined a secondary reference line.

The conduit spacer 10 can be provided in different sizes (FIG. 10). Most preferably, a length of each conduit spacer 10 between a proximal end and a distal end is similar in some respects and distinct in some respects. In this example embodiment, the smaller conduit spacers are longer and the larger conduit spacers are shorter, so that an edge of each conduit C held by the conduit spacer 4, 6, 8, 10, 12, 14, 16, 18 (FIG. 10), which edge is most distant from the conduit spacer, is a similar distance away from the step 25 or lip 35. In this way, regardless of conduit C size, each conduit extends a similar distance away from a form board F (FIG. 3) so that each conduit is a similar distance away from an interior surface of a wall extending up from a foundation supported by the cementitious material, which is supported by the form board F during pouring and hardening.

In this example embodiment, the two largest sizes including conduit spacer 16 and conduit spacer 18 corresponding with three inch and four inch conduits extend slightly further from forms F than the other spacers 4, 6, 8, 10, 12, 14. In particular, the two larger sizes can extend to a secondary reference line 80 (FIG. 10) while the other conduit spacers extend to a main reference line 70, with these two reference lines provided so that they provide close to uniform positioning for different size spacers, but the largest conduits C are optimally positioned and allowed to extend slightly further away from the form board when supported by the conduit spacers 16, 18. Also, at least the conduit spacer 18 is configured without the step 25 as four inch conduits C only fit within six inch walls.

A width of each conduit spacer 10 is also modified, being generally proportional to a size of the conduit C which is to be held by each conduit spacer. Dovetails 40 or other interlocks are preferably provided a similar distance away from proximal ends of each conduit spacer, so that the proximal ends of the conduit spacers are aligned with each other when attached to each other and to the form board F (FIGS. 1 and 2).

The two largest conduit spacers 16, 18 are shown without optional dovetails 40 or other interlocks. Because of the size of these conduit spacers 16, 18, a strength of the dovetails 40 or other interlocks can be compromised. As an option, such spacers 16, 18 could be made wider and still have interlocks such as the dovetails 40.

The main body 20 of the conduit spacer 10 is a substantially planar horizontal structure when oriented in use attached to a top of a form board E The main body 20 includes a planar top surface 25 with lateral sides 22 which generally extend from the proximal end to the distal end of each conduit spacer 10. Nail holes 21 pass into this top surface 24 and out of a bottom surface 26 (FIG. 5) opposite the top surface 24. The nail holes 21 can accommodate nails and or other elongate fasteners (e.g. screws) for holding the conduit spacer 10 to the form board F.

The bottom surface 26 preferably includes ribs 28 to strengthen the main body 20. Collars 29 surround the nail holes 21 to provide further stiffening support. In this embodiment, ribs 28 extend both laterally and longitudinally perpendicular to each other to add stiffness to the main body 20 and minimize the required amount of material to form the main body 20.

In this embodiment, the main body 20 terminates at a proximal end thereof at a step 25 where the main body 20 transitions into the extension body 30. The step 25 defines a portion of the main body 20 which extends vertically downwardly from a proximal end of the main body 20. In one embodiment, the step 25 is about as long vertically as the thickness of the main body 20 between the top surface 24 and bottom surface 26. In one embodiment, this thickness is about ¼ of an inch. A gusset 27 is preferably adjacent to the step 25 and on an upper surface of the extension body 30, adjacent to the step 25 and adjacent to a proximal end of the top surface 24. Gussets 27 can help to strengthen the conduit spacer 10 at the step 25 where the main body 20 transitions into the extension body 30. While one gusset 27 is shown, multiple gussets could alternatively be provided.

When the conduit spacer 10 is to be used with a foundation designed to support four inch walls, the step 25 can be located just outside on the proximal edge of the upper edge of the form board E Nails and/or other fasteners can pass through the nail holes 21 and into a top surface of the form boards F to secure the conduit spacer 10 to the form boards E While two nail holes 21 are shown, in alternate embodiments one nail hole 21 could be provided or more than two nail holes 21 could also be provided. Typically, the nails N and/or other fasteners are in the form of double headed nails to facilitate ease of removal of the nails after the cementitious material has hardened sufficiently to allow for stripping of the form boards F from the space S where the concrete has now at least partially hardened within the foundation of the building or other structure.

With continuing reference to FIGS. 3, 4 and 6, details of the extension body 30 are described according to this example embodiment. Like the main body 20, the extension body 30 is preferably formed as a monolithic mass of material along with the main body 20. Alternatively, the extension body 30 could be fastened to the main body 20 such as with fasteners, bonding agents, or using other joining techniques.

Extension body 30 extends from a proximal end adjacent to the form board F and a distal end adjacent to the step 25. A top surface 34 is provided opposite a bottom surface 36 which are both preferably substantially planar and horizontal, and in this embodiment having a vertical spacing about ¼ of an inch. Lateral sides 32 define lateral edges of the extension body 30. A lip 35 extends downwardly from the proximal end of the extension body 30, such as about ¼ of an inch. The extension body 30 includes ribs 38 within the bottom surface 36 (FIG. 6), which in this embodiment extend both laterally and longitudinally. Collars 39 surround nail holes 31 passing through the extension body 30 between the top surface 34 and the bottom surface 36. The ribs 38 help to strengthen the extension body 30 similar to strengthening of the main body 20 with the ribs 28.

When the conduit spacer 10 is to be utilized upon form boards adjacent to a foundation supporting six inch walls (or some other larger size wall greater than four inches) the lip 35 is provided adjacent the outer edge at the proximal side of the upper surface of the form board E This causes conduits C adjacent to the conduit spacer 10 to be properly spaced to reside were desired within a six inch wall (or other wall larger than four inches thick). Nails and/or other fasteners would pass through the nail holes 31 of the extension body 30 and into the upper surface of the form boards F to anchor the conduit spacer 10 to the form boards F for such a six inch wall use case.

While the top surfaces 24, 34 and bottom surfaces 26, 36 are shown as generally planar, they could be angled on at least portions thereof, such as to elevate a yoke 50 at a distal end of the conduit spacer 10 relative to an upper surface of the form boards F. Other details could also be modified in various different embodiments, many of which would still be encompassed by the claims provided herein below.

The example embodiment shows interlocks on lateral sides 22 thereof in the form of dovetails 40. Left lateral sides 22 feature a male dovetail 42 extending laterally therefrom. Right lateral sides 22 feature female dovetails 44 extending laterally thereinto. While, these dovetails 40 are shown with a trapezoidal dovetail size and shape which are similar to each other in both size, shape, and position relative to the steps 25 and lips 35 on the various different conduit spacers 10, other shapes could be provided. Similarly, other locations can be provided. Preferably these shapes and locations are similar to each other to facilitate adjacent interlocking of conduit spacers 10, 12 (FIGS. 1 and 2) to each other.

While the interlocks, shown here in the form of dovetails 40, are incorporated into the lateral sides 22 of the conduit spacers 10, 12, other forms of interlocks could be provided. For instance, a separate third piece could act to join two separate interlocks together and in one embodiment, all of the dovetails 40 could be female dovetails 44 and such a locking third piece could be sized and shaped to fit into this space and hold the two conduit spacers 10 together. Other shapes besides trapezoidal dovetails 40 could also be provided in various alternate embodiments of this invention, many of which would be encompassed by the claims provided herein below.

With continuing reference to FIGS. 3, 4 and 6, details of the yoke 50 are described, disclosing one form of engagement between the conduit spacer 10 and a conduit C. The yoke 50 includes a saddle 52 which is preferably in the form of a semi-cylindrical or semi-circular surface. This saddle 52 preferably has a constant radius of curvature matching a radius of curvature of a conduit C to be supported by the yoke 50. As an alternative, conduits C smaller than the yoke 50 could also conceivably be held within the yoke 50, but with less security.

The saddle 52 extends to tips 54 on each lateral side of the yoke 50, defining an extreme distal portion of the conduit spacer 10. Preferably angular measure of the saddle 52 is no more than about 180°. In this way, after use of the conduit spacer 10, nothing about the saddle 52 keeps the conduit spacer 10 from transitioning laterally away from the conduit C and away from the hardened cementitious material. The entire conduit spacer 10 can then be conveniently reused.

Typically, and to facilitate removal of the conduit spacer 10, first nails N and/or other fasteners would be removed from the holes 21, 31. Then, if any lanyards, such as wire W have been used to hold the conduit C to the yoke 50, any such lanyards would be opened, cut or otherwise disengaged from the conduit C. The spacer 10 (or assembly of multiple conduit spacers 10, 12 (FIGS. 1 and 2) can be conveniently moved laterally away from the conduits C (along arrow B of FIG. 1) after removal of nails N (along arrow A of FIG. 1). Finally, form boards F can be stripped from the space S where the cementitious material has hardened (along arrow D of FIG. 1).

To further assist in holding the conduit C firmly adjacent to and perpendicular to the yoke 50 of the concrete spacer 10, a tab 60 is in one embodiment provided extending up from the top surface 24 midway between the lateral sides 22. This tab 60 is preferably planar and oriented perpendicular to the top surface 24, and within a plane equal distance between the two lateral sides 22. The tab 60 includes a face 62 which is preferably aligned with the semi-circular saddle 52. The face 62 of the tab 60 thus assists in keeping the conduit C adjacent to the saddle 52 and from pivoting away from a vertical orientation. Sidewall 64 of the tab 60 defines a thickness of the tab 60 which can be in one embodiment about ¼ of an inch. A buttress 66 extends downwardly on a side of the tab 60 opposite the face 62. A hole 65 passes laterally through the two sidewalls 64 of the tab 60. A lanyard such as wire W can pass through this hole 65 to secure the conduit C to the yoke 50 of the conduit spacer 10. Alternately, lanyards could include zip ties, string, twist ties, Velcro straps, or other conduit C restraints.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A spacer assembly for supporting conduits within cementitious material that is hardening, the spacer assembly comprising in combination:
   at least two spacers;
   each spacer including a body extending at least partially between a proximal end and a distal end;
   said proximal end configured to attach to a form board adjacent to a desired position for at least one of the conduits within the hardening cementitious material;
   said distal end extending over the hardening cementitious material to a location where at least one of the conduits is to be supported;
   said distal end including a conduit engagement sized to support a conduit adjacent thereto with the conduit extending up out of the hardening cementitious material;
   each spacer including at least one lateral side extending at least partially between said distal end and said proximal end, said lateral side of each said spacer including an interlock; and
   said interlock of each said spacer configured to engage with said interlock of another one of said at least two spacers, to hold said at least two spacers together through said interlocks of each said at least two spacers.

2. The spacer assembly of claim 1 wherein said engagement includes a semi-circular saddle, said semi-circular saddle having a radius of curvature at least as great as a diameter of a conduit to be supported adjacent thereto, as the conduit extends up out of the hardening cementitious material.

3. The spacer assembly of claim 1 wherein a tab extends upwardly from a top surface of said body of at least one of said at least two spacers, said tab including a face aligned with said saddle such that said face and said saddle both support a conduit extending upwardly out of the hardening cementitious material.

4. The spacer assembly of claim 3 wherein said tab includes a hole passing laterally therethrough, said hole supporting a lanyard which is able to gird the conduit when the conduit is adjacent to said tab and said saddle.

5. The spacer assembly of claim 1 wherein said proximal end of said body includes at least one step extending down from said body on a portion of said body on a proximal side of said engagement, said step spaced from said engagement by a distance similar to a thickness of a form board plus a desired spacing away from the form board to be exhibited by a conduit that is located adjacent to said engagement.

6. The spacer assembly of claim 5 wherein said step defines a transition from a main portion of said body and an extension portion of said body, said main portion of said body located closer to said engagement than the extension portion and said main portion of said body also located higher than said extension portion of said body when said spacer assembly is attached to an upper surface of a form board adjacent to hardening cementitious material, and with said extension portion of said body on a proximal side of said main body, said extension portion including a lip which extends downwardly from a proximal end of said extension portion of said body, said extension portion of said body spacing said lip from said step by an adjustment distance to accommodate walls of different thicknesses extending up from the hardening cementitious material, with the conduits optimally spaced within such walls of different thicknesses depending on whether said extension portion of said body is attached to the form board with said lip adjacent to an outer edge of an upper surface of the form board or said main body is attached to the form board with said step adjacent to the outer edge of the upper surface of the form board.

7. The spacer assembly of claim 1 wherein at least one hole passes through said body of at least one of said spacers, said hole sized to receive a mechanical fastener passing therethrough and into a form board beneath said hole.

8. The spacer assembly of claim 1 wherein said interlocks include a male interlock on a first lateral side of said body of a first one of said spacers, and a female interlock on a second lateral side of said body of a second one of said spacers opposite said first lateral side of said body, said male interlock having a complementary form with said female interlock.

9. The spacer assembly of claim 8 wherein each of said interlocks has a dovetail shape of similar size and being either a male or female counterpart.

10. A spacer for supporting a conduit extending up out of hardening cementitious material, the spacer comprising a combination:
    a body extending at least partially between a proximal end and a distal end;
    said proximal end configured to be attached to a form board adjacent to a desired position for the conduit extending up out of the hardening cementitious material;
    said distal end extending over the hardening cementitious material at a location where the conduit is to be supported;
    said distal end including a conduit engagement sized to support a conduit adjacent thereto with the conduit extending up out of the hardening cementitious material; and
    wherein said engagement includes a semi-circular saddle, said semi-circular saddle having a radius of curvature at least as great as a diameter of the conduit to be supported adjacent thereto as the conduit extends up out of the hardening cementitious material.

11. The spacer of claim 10 wherein said proximal end of said body includes at least one step extending down from said body on a portion of said body on a proximal side of said engagement, said step spaced from said engagement by a distance similar to a thickness of a form board plus a desired spacing away from the form board to be exhibited by a conduit that is located adjacent to said engagement.

12. The spacer of claim 11 wherein said body includes at least one hole passing therethrough, said hole spaced from said step by a distance that is less than the thickness of the form board, such that when the step is adjacent to an upper edge of the form board on a side opposite the hardening cementitious material, the hole is located above the form board.

13. The spacer of claim 12 wherein said step defines a transition from a main portion of said body and an extension portion of said body, said main portion of said body located closer to said engagement than the extension portion and said main portion of said body also located higher than said extension portion of said body when said spacer assembly is attached to an upper surface of a form board adjacent to hardening cementitious material, and with said extension portion of said body on a proximal side of said main body, said extension portion including a lip which extends downwardly from a proximal end of said extension portion of said body, said extension portion of said body spacing said lip from said step by an adjustment distance to accommodate walls of different thicknesses extending up from the hardening cementitious material, with the conduit optimally spaced within such walls of different thicknesses depending on whether said extension portion of said body is attached to the form board with said lip adjacent to an outer edge of an upper surface of the form board or said main body is attached to the form board with said step adjacent to the outer edge of the upper surface of the form board.

14. The spacer of claim 10 wherein a tab extends upwardly from a top surface of said body with a face of said tab extending upwardly from said semi-circular saddle and aligned with said semi-circular saddle when said spacer is located above hardening cementitious material and extending from a form board adjacent to the hardening cementitious material.

15. The spacer of claim 14 wherein said tab includes a hole passing laterally therethrough, said hole supporting a lanyard which is able to gird the conduit when the conduit is adjacent to said tab and said saddle.

16. The spacer of claim 10 wherein said body of said spacer includes at least one lateral side extending at least partially between said distal end and said proximal end, said lateral side of said spacer including an interlock thereon; and
said interlock configured to engage with an interlock of another spacer to hold said spacer to an adjacent spacer in an interlocking fashion.

17. The spacer of claim 16 wherein said interlock includes a male dovetail shape sized to fit within a female dovetail shape interlock of another spacer.

18. A method for supporting at least one conduit extending vertically upward out of hardening cementitious material supported laterally by a form board on an exterior of a wall location of a foundation structure, the method, including the steps of:
attaching a spacer to the form board, the spacer having a body extending at least partially between a proximal end and a distal end, the proximal end configured to attached to the form board adjacent to a desired position for the conduit extending up out of the hardening cementitious material, the distal end extending over the hardening cementitious material at a location where the conduit is to be supported, the distal end including a conduit engagement sized to support the conduit adjacent thereto with the conduit extending up out of the hardening cementitious material and wherein the engagement includes a semi-circular saddle, the semi-circular saddle having a radius of curvature at least as great as a diameter of the conduit to be supported adjacent thereto as the conduit extends up out of the hardening cementitious material;
placing a conduit extending primarily vertically and abutting the semi-circular saddle of the engagement of the spacer; and
pouring cementitious material around the conduit and adjacent to the form board while the spacer is attached between the form board and the conduit.

19. The method of claim 18 including the further step of removing the spacer from the form board and removing the spacer from the conduit by merely translating the spacer laterally away from the conduit.

20. The method of claim 19 including the further step of interlocking multiple ones of the spacers to each other through interlocks on lateral sides of each said spacer, which interlocks are complementarily formed with each other to interlock together.

* * * * *